United States Patent

[11] 3,581,774

| [72] | Inventors | Ernest N. Oeland, Jr.<br>West Covina;<br>Gary D. Drage, Kaysville, Utah |
|---|---|---|
| [21] | Appl. No. | 811,922 |
| [22] | Filed | Apr. 1, 1969 |
| [45] | Patented | June 1, 1971 |
| [73] | Assignee | the United States of America as represented by the Secretary of the Navy |

[54] CONSTANT PRESSURE ACCUMULATOR
5 Claims, 4 Drawing Figs.

[52] U.S. Cl. ................................................. 138/31, 267/156
[51] Int. Cl. ..................................................... F16l 55/04
[50] Field of Search .......................................... 138/31; 267/156

[56] References Cited
UNITED STATES PATENTS
563,192   6/1896   De Laval ...................... 138/31

| 3,075,558 | 1/1963 | Von Forell .................. | 138/31X |
| 3,351,097 | 11/1967 | Moran ......................... | 138/31X |
| 3,416,431 | 12/1968 | Hitzeroth .................... | 267/156X |

Primary Examiner—Laverne D. Geiger
Assistant Examiner—Richard J. Sher
Attorneys—Justin P. Dunlavey and Ervin F. Johnston ABSTRACT: An accumulator for maintaining a substantially constant pressure above ambient in a hydraulic system including a hollow cylinder which has an opening at one location to ambient and an opening at another location for communication with the hydraulic system; a piston and pushrod disposed in the cylinder for reciprocatory movement between the open locations; and a negator spring which has an arcuate end which is connected to the pushrod and an opposite end which is connected to the cylinder. A rolling diaphragm may be connected to an end of the piston and to the cylinder at a location about the piston wall.

PATENTED JUN 1 1971

3,581,774

INVENTORS.
ERNEST N. OELAND, JR.
GARY D. DRAGE
BY
ERVIN F. JOHNSTON
ATTORNEY.

CONSTANT PRESSURE ACCUMULATOR

The invention described herein may be manufactured and used by or for the Government of the United States of America for governmental purposes without the payment of any royalties thereon or therefor.

Most of the deep submersible vehicles utilize hydraulic systems for the operation of moving components such as manipulator arms and TV cameras. It is necessary that many of these hydraulic systems be at a higher pressure than ambient so as to prevent any leakage of salt water into the system. The means for maintaining this differential pressure between ambient pressure and pressure of the hydraulic system is an accumulator.

In order to obtain optimum responsiveness of the moving components which are operated by the hydraulic system it is necessary that the differential pressure between ambient and the accumulator remain substantially constant. Previous accumulators using coil springs, metal bellows, or pressurized gas have not provided the desired constant pressure and consequently the moving components have had erratic and unpredictable movements. The present invention has overcome this problem by providing a piston and pushrod disposed in a cylinder for reciprocatory movement and a negator spring which is connected between the pushrod and the cylinder. By utilizing a negator spring a constant biasing force is applied to the piston so that a substantially constant pressure differential is maintained between ambient and the accumulator. Another unique advantage of the present invention is that the negator spring has enabled a significant increase in the displacement or workable stroke of the piston over previous accumulators.

An object of the present invention is to overcome the aforementioned problems associated with prior art accumulators.

Another object is to provide an accumulator which has increased displacement and maintains a substantially constant pressure above ambient in a hydraulic system.

A further object is to provide an accumulator which is operable in a sea water environment to maintain a substantially constant pressure above sea pressure in a hydraulic system with improved displacement and pressure capabilities.

Other objects and many of the attendant advantages of this invention will be readily appreciated as it becomes better understood by reference to the description and accompanying drawings which follow.

Figure 1:
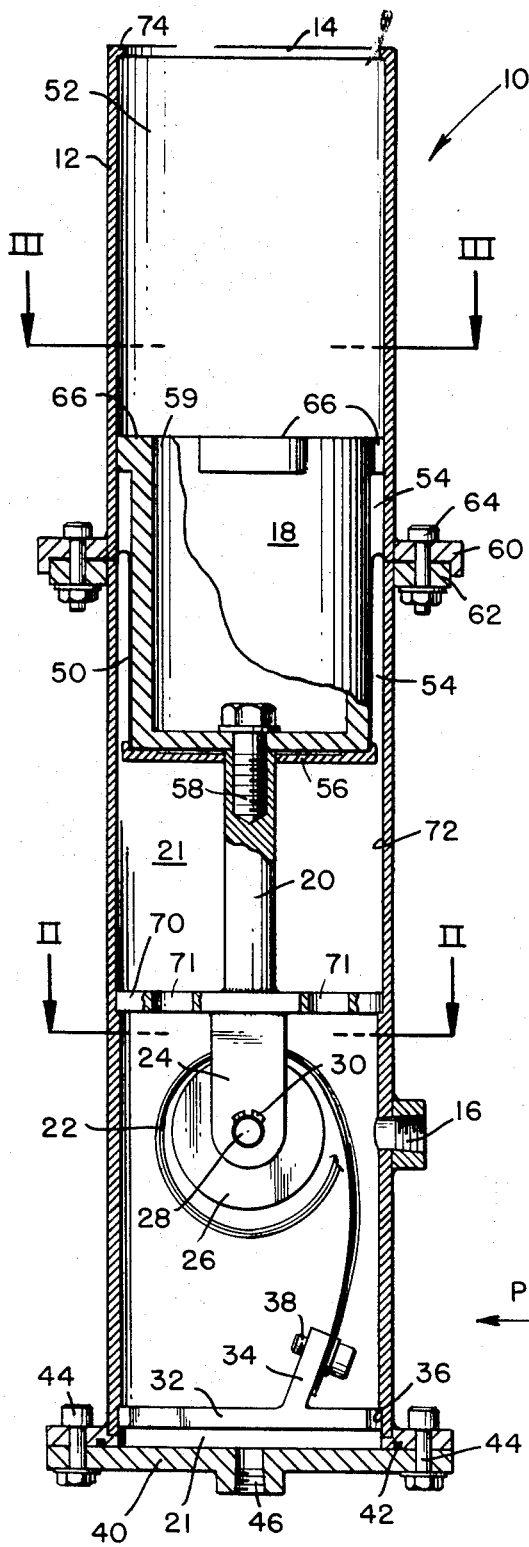
FIG. 1 is a longitudinal cross-sectional view through the accumulator.

Referring now to the drawing wherein like reference numerals designate like or similar parts throughout the several views there is shown in FIG. 1 a constant pressure accumulator 10 for maintaining a substantially constant pressure above ambient pressure in a hydraulic system (not shown). The ambient environment may be sea water and the hydraulic system may be employed for operating movable components, such as manipulator arms and TV cameras on a deep submersible vehicle.

The accumulator includes a hollow cylinder 12 which may have an opening 14 at its top end which is adapted to open into a sea water environment, and an opening 16 in a bottom portion which is adapted to communicate the cylinder with a hydraulic system (not shown), such as with a reservoir within the hydraulic system. The opening 16 may be threaded to receive a fitting (not shown) from the reservoir of the hydraulic system. Disposed in the cylinder 12 is a piston 18 and a push rod 20 which are adapted for reciprocatory movement between the openings 14 and 16. Below the piston 18 is a working displacement chamber 21 which is adapted to communicate with the hydraulic system through the opening 16.

Figure 2:
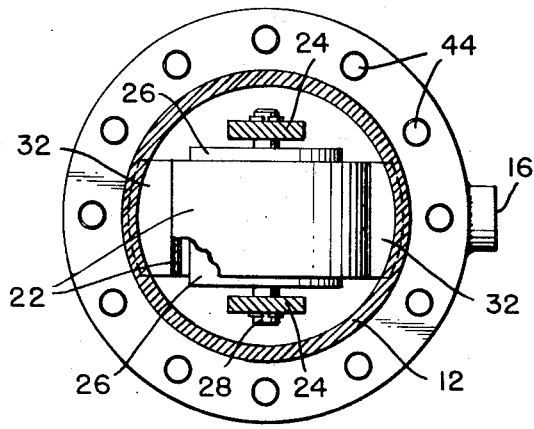
FIG. 2 is a view taken along plane II–II of FIG. 1.
Figure 3:
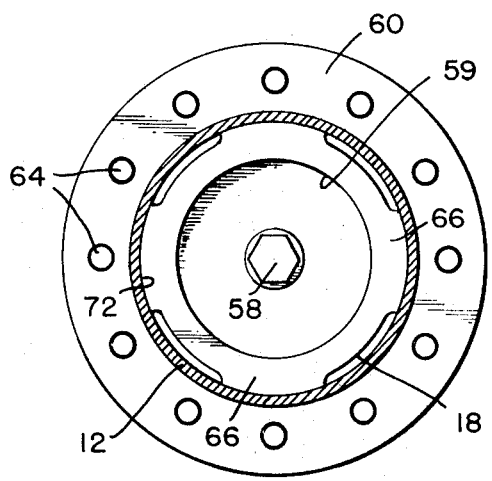
FIG. 3 is a view taken along plane III–III of FIG. 1.
Figure 4:
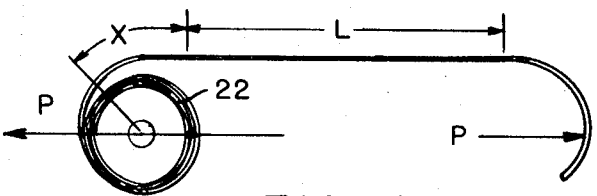
FIG. 4 shows a side view of a negator spring.

We have found that a constant pressure can be maintained and increased displacement can be achieved in the accumulator by providing negator springs 22 which are connected between the pushrod 20 and the cylinder 12. A negator spring, which maintains a constant resistance to uncoiling throughout its entire deflection, is described in detail hereinbelow. The pushrod 20 may be bifurcated at its bottom end 24 and a roller 26 may be rotatably mounted between the bifurcations by a pin 28. The pin 28 may be retained in place by a pair of snap rings 30 (one of which is shown in FIG. 1). As shown in FIG. 1 arcuate ends of the negator springs 22 arc about the roller 26. While not necessary, the springs 22 are shown substantially the same width as the roller 26 in FIG. 2. It should be noted that the negator springs 22 may make further turns about the roller 26 so as to provide increased displacement within the working chamber 21 of the accumulator. The other ends of the negator springs 22 may be connected to the cylinder by a plate 32 which has an upwardly extending projection 34 which, as shown in FIG. 1, is at an angle to the plate. The plate 32 may be retained in a counterbore 36 in the bottom end of the cylinder 12, and the ends of the negator springs 22 may be fixedly connected to the projection 34 by any suitable means such as a bolt 38. The number of negator springs utilized depends upon the differential in pressure desired between the hydraulic system and ambient. The negator extension spring 22 is possible because a piece of metal is so stressed that it can be deflected from a small curvature to a completely straightened condition without permanent deformation. The negator spring develops its resisting force incrementally, rather than cumulatively. When extended, as shown in FIG. 4, each incremental part of the straightened portion L has been deflected from its natural curvature in passing through the working zone X. In extending the negator spring, energy is stored in the increased L section. When the negator is allowed to coil, it surrenders the stored energy at a constant rate, until the entire member is coiled into its relaxed condition. Only the X area is capable of absorbing or releasing energy. This, in effect, provides an elastic member whose force is entirely independent of its varying length. Unlike the negator, the usual helical spring, at any movement, is uniformly stressed throughout. Either it is fully relaxed in all portions or equally stressed in all portions as it is extended or compressed. The load and stress, according to Hooke's Law, are in direct proportion to the amount the member is extended. In the negator spring the force P at any extension is determined only by the work required to straighten the material in zone X from its coiled condition. Force P will then remain constant with extension as long as each incremental length of the negator spring has an equal increase in stress as its is straightened. This condition results in a negator spring having a zero gradient. The material in zone L has been put under stress, and energy stored in it is proportional to the length of straightened material. This spring is also described in U.S. Pat. Nos. 2,609,191, 2,609,192 and 2,647,743 and is obtainable from Hunter Spring Co., in Lansdale, Pa.

The bottom end of the cylinder 12 may be closed by a cap 40 which is sealed by an O-ring 42 and fixedly retained to the cylinder 12 by bolt-and-nut combinations 44. The cap 40 may be provided with a threaded opening 46 for charging the working displacement chamber 21 with a fluid which is used in the hydraulic system. After charging the displacement chamber 21 with the fluid the opening 46 may be closed by a valve (not shown) in the charging apparatus.

In order to protect critical components of the accumulator 10 from a sea water environment we have used a rolling diaphragm 50 which is connected to one end of the piston 18 and to the cylinder 12 at a location about the piston wall. The diaphragm 50, which may be constructed of neoprene-coated cotton cloth or other similar material, is flexible and in its unmounted condition may take the shape of an open generally cylindrical container. In a proper size, as shown in FIG. 1, the diaphragm is capable of being slipped over the bottom of the piston 18 with its bottom adjacent the piston end so that when the piston reciprocates the diaphragm will roll against the wall of the piston and provide a seal between the sea water in a top cylinder area 52 and the bottom displacement chamber 21. An annular space 54 is provided between the wall of the piston 18 and the wall of the cylinder 12 so as to enable the rolling action of the diaphragm 50. A rolling diaphragm which has been found to work successfully is called "Bellofram" and is made by Bellofram Corp., in Burlington, Mass.

The bottom end of the diaphragm 50 may be connected to the bottom end of the piston 18 by a cap 56 over the diaphragm material. In order to fix the cap 56 in place a top end of the pushrod 20 may abut the bottom of the cap 56 and a bolt 58 may extend through a bottom end of the piston 18, diaphragm 50, and cap 56 for threaded engagement into the top end of the pushrod 20. The top end of the piston may be open at 59 to provide access to the bolt 58. In order to attach the diaphragm 50 to the cylinder 12 the cylinder may be divided into top and bottom portions with these portions having respective exterior annular flanges 60 and 62. The top annular edge of the diaphragm 50 may be disposed between the flanges 60 and 62 and the flanges may be fixedly connected together to retain the diaphragm by bolt and nut combinations 64.

Since the piston 18 is spaced from the wall of the cylinder 12 it is desirable that a means be provided for guiding reciprocatory movement of the piston within the cylinder. This may be accomplished by providing the top end of the piston 18 with a plurality of radially extending projections or lugs 66 which are slidable along the cylinder wall. As a further guide to piston reciprocatory movement an annular platelike guide member 70 may be connected to the pushrod 20 intermediate its ends so as to be slidable along the cylinder wall. As shown in FIG. 1 a top portion of the piston rod 20 may be connected to a top side of the guide member 70 and the bottom bifurcated ends 24 of the piston rod may be connected to a bottom side of the guide member. These connections may be made by any suitable means such as welding. The guide member 70 may be provided with openings 71 for the passage of fluid when the member 70 reciprocates in the working chamber 21.

In order to provide a stop for downward movement of the piston 18 a top portion of the cylinder 12 may be provided with a counterbore 72. The guide member 70 may then slide within this counterbore 72 and be prevented from downward movement therebelow. A stop for upward movement of the piston 18 may be accomplished by an annular inwardly extending projection 74 at the top of the cylinder 12 which is engageable with the top of the piston 18. Alternatively, the top of the cylinder may be grooved and provided with a retaining ring (not shown) for stopping purposes.

In the operation of the invention a hydraulic system (not shown) is connected to the accumulator at opening 16 and the working displacement chamber 21 of the cylinder is charged with a fluid under pressure through opening 46. The fluid is charged within the chamber 21 to a desired pressure above ambient sea pressure, as dictated by the strength of the negator springs 22, so as to prevent salt water from leaking into the hydraulic system (not shown). In FIG. 1 the piston 18 is shown in the uncharged position and upon charging to the desired pressure the piston 18 will move upwardly. During this movement the negator spring 22 applies a constant downward biasing force to the piston rod 20. When the accumulator 10 is moved to varying ocean pressure environments and/or fluid leaks from the hydraulic system the piston 18 will move accordingly and the negator spring 22 still applies a substantially constant biasing force so that a substantially constant differential in pressure is maintained between the accumulator and the ocean pressure environment. The negator spring 22 also enables a large displacement of the piston 18. Additional displacement is obtained by providing extra turns of the negator spring about the roller 26, and increasing the cylinder length. During reciprocatory movement of the piston 18 the diaphragm 50 maintains a seal between the ocean water and the chamber 21. Accordingly, the fluid in the chamber 21 is protected from sea water contamination and the negator spring 22 and associated critical components of the accumulator are protected from corrosion.

Other objects and many of the attendant advantages of this invention will be readily appreciated as it becomes better understood by reference to the description and accompanying claims which follows.

We claim:

1. An accumulator for maintaining a substantially constant pressure above ambient in a hydraulic system comprising:
    a hollow cylinder which has an opening at one location to ambient and has an opening at another location for communication with the hydraulic system;
    a piston and pushrod disposed in the cylinder for reciprocatory movement between the open locations;
    a negator spring which has an arcuate end which is connected to the push rod and an opposite end which is connected to said cylinder;
    a roller rotatably connected to said pushrod;
    the arcuate end of said negator spring being connected to the push rod by arcing about said roller;
    a bottom end of the cylinder having a counterbore;
    a plate disposed in the bottom counterbore, said plate having an angular projection; and
    said opposite end of the negator spring being connected to the cylinder by being connected to said projection.

2. Accumulator as claimed in claim 1 including:
    a top portion of said cylinder having a counterbore;
    an annular guide member connected to the pushrod intermediate its ends and slidably disposed in the top counterbore; and
    the opening in which is communicable with the hydraulic system being located below the top counterbore.

3. An accumulator as claimed in claim 2 wherein:
    the wall of the piston is spaced from the inner wall of the cylinder; and including;
    guide means at the top of the piston for slidable action along the cylinder wall.

4. An accumulator as claimed in claim 3 including:
    means located at the top of the cylinder for stopping upward movement of the piston.

5. An accumulator as claimed in claim 4 including:
    a rolling diaphragm connected to the bottom end of the piston and to the cylinder at a location about the piston wall.